(12) United States Patent
Hwang et al.

(10) Patent No.: US 11,809,400 B2
(45) Date of Patent: Nov. 7, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Inki Hwang, Suwon-si (KR); Seungyeol Hyun, Suwon-si (KR); Jemin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 17/545,589

(22) Filed: Dec. 8, 2021

(65) Prior Publication Data
US 2022/0197887 A1 Jun. 23, 2022

Related U.S. Application Data

(63) Continuation of application No. PCT/KR2021/007371, filed on Jun. 14, 2021.

(30) Foreign Application Priority Data

Dec. 18, 2020 (KR) .................. 10-2020-0178987

(51) Int. Cl.
*G06F 16/23* (2019.01)
*G06F 16/2455* (2019.01)
*G06F 16/248* (2019.01)

(52) U.S. Cl.
CPC ........ *G06F 16/2343* (2019.01); *G06F 16/248* (2019.01); *G06F 16/24568* (2019.01)

(58) Field of Classification Search
CPC ........... G06F 16/2343; G06F 16/24568; G06F 16/248
See application file for complete search history.

(56) References Cited

U.S. PATENT DOCUMENTS 6,389,420 B1 * 5/2002 Vahalia ............... G06F 16/1774
709/248
6,651,123 B1 * 11/2003 Hutchison ................ G06F 9/52
718/1

(Continued)

FOREIGN PATENT DOCUMENTS

JP          11-272534 A      10/1999
KR    10-2008-0107339 A      12/2008

(Continued)

OTHER PUBLICATIONS

International Search Report (PCT/ISA/210) dated Sep. 9, 2021, issued by the International Searching Authority in International Application No. PCT/KR2021/007371.

(Continued)

*Primary Examiner* — Jorge A Casanova
(74) *Attorney, Agent, or Firm* — Sughrue Mion, PLLC

(57) ABSTRACT

An electronic apparatus includes a memory storing a plurality of pieces of data by a distributed data storing method; a communication interface configured to be communicatively connected to an external apparatus; and a processor configured to: based on identifying that first data corresponding to the external apparatus among the plurality of pieces of data stored in the memory has been changed to second data, change a state of the second data to a locked state; and control the communication interface to transmit the second data in the locked state to the external apparatus by a streaming method, wherein in the locked state the second data cannot be changed in response to a data change command.

14 Claims, 14 Drawing Sheets

(56) References Cited

U.S. PATENT DOCUMENTS

| | | | |
|---|---|---|---|
| 6,789,096 | B2 | 9/2004 | Sankaran et al. |
| 6,895,471 | B1 | 5/2005 | Tse et al. |
| 7,565,335 | B2 | 7/2009 | Tang et al. |
| 7,827,350 | B1 * | 11/2010 | Jiang .................. G06F 11/1469 707/649 |
| 8,266,122 | B1 * | 9/2012 | Newcombe ............ G06F 16/80 707/705 |
| 8,285,709 | B2 | 10/2012 | Candea et al. |
| 9,678,968 | B1 * | 6/2017 | Taylor ................ G06F 11/1435 |
| 9,734,157 | B1 * | 8/2017 | Brahma Raju ........... G06F 3/06 |
| 10,169,437 | B2 | 1/2019 | Dantressangle et al. |
| 11,216,316 | B1 * | 1/2022 | Sproat .................. G06F 16/182 |
| 2010/0191884 | A1 * | 7/2010 | Holenstein .......... G06F 11/2094 707/613 |
| 2012/0141093 | A1 | 6/2012 | Yamaguchi et al. |
| 2014/0068127 | A1 * | 3/2014 | Baron .................... G06F 9/526 710/200 |
| 2016/0004718 | A1 * | 1/2016 | Lin .................... G06F 11/1004 707/690 |
| 2018/0349408 | A1 * | 12/2018 | Jewell ................ G06F 16/1734 |
| 2019/0163790 | A1 | 5/2019 | Jennings et al. |
| 2020/0293382 | A1 * | 9/2020 | Ivancich ................. G06F 9/526 |
| 2021/0157830 | A1 * | 5/2021 | Chen ..................... G06F 16/93 |

FOREIGN PATENT DOCUMENTS

| | | |
|---|---|---|
| KR | 10-2010-0067976 A | 6/2010 |
| KR | 10-1926566 B1 | 12/2018 |

OTHER PUBLICATIONS

Written Opinion (PCT/ISA/237) dated Sep. 9, 2021, issued by the International Searching Authority in International Application No. PCT/KR2021/007371.

* cited by examiner

ELECTRONIC APPARATUS AND CONTROLLING METHOD THEREOF

CROSS-REFERENCE TO RELATED APPLICATIONS

This application is a bypass continuation of International Application No. PCT/KR2021/007371, filed on Jun. 14, 2021, which is based on and claims priority to Korean Patent Application No. 10-2020-0178987, filed on Dec. 18, 2020, in the Korean Intellectual Property Office, the disclosures of which are incorporated by reference herein in their entireties.

BACKGROUND

1. Field

The disclosure relates to an electronic apparatus and a controlling method thereof, and more particularly relates to an electronic apparatus which transmits data stored in a database by a streaming method and a controlling method thereof.

2. Description of Related Art

A distributed file system may be used to back up data stored in a terminal apparatus of a user or a client. The distributed file system may refer to a management system for storing and transmitting data in a file or block unit and may refer to a system in which a plurality of computers are connected to each other through a network to easily access and manage data.

A structured query language (SQL) server may be used to access and manage the data stored in the distributed file system. The SQL server may access and manage the data stored in the distributed file system by using a query language for a database.

The distributed file system may be connected to a plurality of terminal apparatuses to back up data stored in the terminal apparatuses or transmit the data stored in the distributed file system to the terminal apparatuses.

The distributed file system and the terminal apparatuses may synchronize data periodically. There is a problem that, when some data is changed in the periodic synchronization process, the distributed file system and the terminal apparatuses need to transmit the entire data, not just some of the data. This is because that, in a case of using the structured query language (SQL) server, there is no instruction for determining only a change of data.

In addition, there is a problem that, when the entire data is transmitted to change only some of the data, the network cost increases. Further, there is a problem that the time taken to delete the entire data and store entire new data increases, thereby causing a delay of real-time data analysis.

SUMMARY

Provided are an electronic apparatus which proceeds synchronization based on some changed data, not the entire data, and a controlling method thereof.

According to an aspect of the disclosure, an electronic apparatus may include a memory storing a plurality of pieces of data by a distributed data storing method; a communication interface configured to be communicatively connected to an external apparatus; and a processor configured to: based on identifying that first data corresponding to the external apparatus among the plurality of pieces of data stored in the memory has been changed to second data, change a state of the second data to a locked state; and control the communication interface to transmit the second data in the locked state to the external apparatus by a streaming method, wherein in the locked state, the second data cannot be changed in response to a data change command.

The processor may be further configured to divide the second data in the locked state into a plurality of groups each having a predetermined size unit. The controlling the communication interface to transmit the second data may include controlling the communication interface to transmit the plurality of divided groups to the external apparatus by the streaming method.

The processor may be further configured to divide the second data into a plurality of groups each having a predetermined size unit, change a state of one group among the plurality of groups to the locked state, and control the communication interface to transmit the one group in the locked state to the external apparatus.

The processor may be further configured to, based on the second data in the locked state being transmitted to the external apparatus, change the state of the second data in the locked state to an unlocked state, wherein in the unlocked state, the second data can be changed in response to the data change command.

The processor may be further configured to: based on receiving a user input for deleting the second data among the plurality of pieces of data, generate a deletion request signal for deleting the second data; identify whether the second data is being transmitted to the external apparatus; based on the second data being currently transmitted to the external apparatus, change the state of the second data to an unlocked state after completing the transmission of the second data; and based on the second data being in the unlocked state, delete the second data from the memory based on the generated deletion request signal.

The processor may be further configured to, based on the second data being deleted from the memory, control the communication interface to transmit a control signal for deleting the second data stored in the external apparatus to the external apparatus.

The processor may be further configured to: receive identification information of the external apparatus and a first data list indicating data stored in the external apparatus from the external apparatus; obtain a second data list corresponding to the identification information of the external apparatus from among the plurality of pieces of data stored in the memory; identify whether the first data list is the same as the second data list by comparing the first data list with the second data list; based on the first data list being different than the second data list, generate a synchronization control command to set the first data list to be the same as the second data list; and control the communication interface to transmit the generated synchronization control command to the external apparatus. The first data list and the second data list may be metadata lists including at least one of a name, a storage location, a data type, or a data size of each of a plurality of contents stored in the external apparatus.

The processor may be further configured to, based on third data which is included in the second data list but is not included in the first data list being identified, control the communication interface to transmit the identified third data to the external apparatus.

The processor may be further configured to, based on fourth data which is not included in the second data list but is included in the first data list being identified, control the communication interface to transmit a control command for deleting the identified fourth data to the external apparatus.

The memory may be a database accessible by a structured query language (SQL).

According to another aspect of the disclosure, a method for controlling an electronic apparatus may include storing a plurality of pieces of data by a distributed data storing method in a memory of the electronic apparatus; communicatively connecting to an external apparatus; based on identifying that first data corresponding to the external apparatus among the plurality of pieces of data stored in the memory of the electronic apparatus has been changed to second data, changing a state of the second data to a locked state; and transmitting the second data in the locked state to the external apparatus by a streaming method, wherein in the locked state, the second data cannot be changed in response to a data change command.

The method may further include dividing the second data in the locked state into a plurality of groups each having a predetermined size unit. The transmitting the second data may include transmitting the plurality of divided groups to the external apparatus by the streaming method.

The method may further include dividing the second data into a plurality of groups each having a predetermined size unit. The changing the state of the second data into the locked state may include changing one group among the plurality of groups to the locked state. The transmitting the second data may include transmitting the one group in the locked state to the external apparatus.

The method may further include based on the second data in the locked state being transmitted to the external apparatus, changing the state of the second data in the locked state into an unlocked state, wherein in the unlocked state the second data can be changed in response to the data change command.

The method may further include, based on receiving a user input for deleting the second data among the plurality of pieces of data, generating a deletion request signal for deleting the second data; identifying whether the second data is being transmitted to the external apparatus; based on the second data being currently transmitted to the external apparatus, changing the state of the second data to an unlocked state after completing the transmission of the second data; and deleting the second data in the unlocked state from the memory based on the generated deletion request signal.

The method may further include, based on the second data being deleted from the memory, transmitting a control signal for deleting the second data stored in the external apparatus to the external apparatus.

The method may further include, receiving identification information of the external apparatus and a first data list indicating data stored in the external apparatus from the external apparatus, obtaining a second data list corresponding to the identification information of the external apparatus from among the plurality of pieces of data stored in the memory; identifying whether the first data list is the same as the second data list by comparing the first data list with the second data list; based on the first data list being different than the second data list, generate a synchronization control command to set the first data list to be the same as the second data list and transmitting the generated synchronization control command to the external apparatus. The first data list and the second data list may be metadata lists including at least one of a name, a storage location, a data type, or a data size of each of a plurality of contents stored in the external apparatus.

The method may further include, based on third data which is included in the second data list but is not included in the first data list being identified, transmitting the identified third data to the external apparatus.

The method may further include, based on fourth data which is not included in the second data list but is included in the first data list being identified, transmitting a control command for deleting the identified fourth data to the external apparatus.

The memory may be a database accessible by a structured query language (SQL).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, the disclosure will be described in detail with reference to the accompanying drawings.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise", "may comprise", "includes," "may include," "consist of", or "may consist of" are used herein to designate a presence of corresponding features (e.g., constituent elements such as number, function, operation, or part), and not to preclude a presence of additional features.

It should be understood that the expression such as "at least one of A or B" and "at least one of A and B" mean only "A", only "B", or both "A and B".

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

In this disclosure, a term "user" may refer to a person using an electronic apparatus or an apparatus using an electronic apparatus (e.g., an artificial intelligence electronic apparatus).

Hereinafter, embodiments of the disclosure will be described in more detail with reference to the accompanying drawings.

Figure 1:
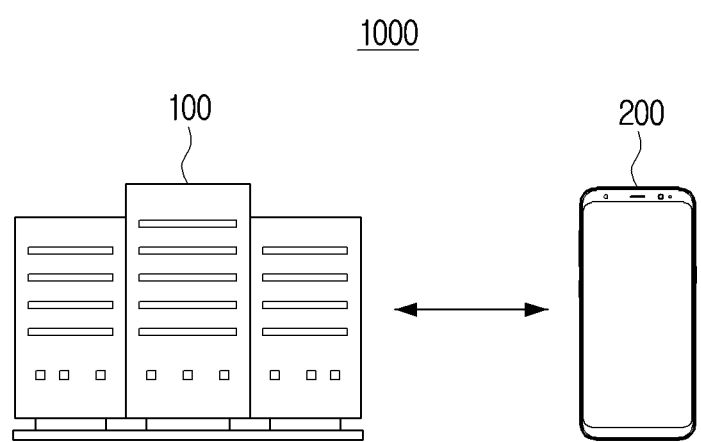
FIG. 1 is a diagram showing a system according to an embodiment.

FIG. 1 is a diagram showing a system according to an embodiment.

Referring to FIG. 1, a system 1000 may include an electronic apparatus 100 and an external apparatus 200.

The electronic apparatus 100 may be an apparatus which stores a plurality of pieces of data. For example, the electronic apparatus 100 may refer to a database server.

The external apparatus 200 may refer to an apparatus which communicates with the electronic apparatus 100. The external apparatus 200 may be an apparatus which transmits and receives data with the electronic apparatus 100. For example, the external apparatus 200 may refer to a terminal apparatus, a user terminal apparatus, or a server connected to a terminal apparatus.

The electronic apparatus 100 and the external apparatus 200 may perform data synchronization. For example, the data synchronization may be performed by transmitting data of the electronic apparatus 100 to the external apparatus 200 or transmitting data of the external apparatus 200 to the electronic apparatus 100. This will be described in detail with reference to FIG. 2.

Figure 2:
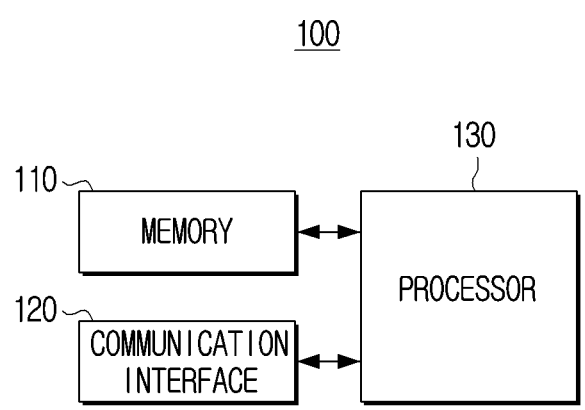
FIG. 2 is a block diagram showing a configuration of the electronic apparatus of FIG. 1 according to an embodiment.

FIG. 2 is a block diagram showing the electronic apparatus 100 according to an embodiment.

Referring to FIG. 2, the electronic apparatus 100 may be configured with a memory 110, a communication interface 120, and a processor 130.

The memory 110 may be implemented as an internal memory such as a ROM (e.g., electrically erasable programmable read-only memory (EEPROM)), a RAM, or the like included in the processor 130 or implemented as a memory separated from the processor 130. In this case, the memory 110 may be implemented in a form of a memory embedded in the electronic apparatus 100 or implemented in a form of a memory detachable from the electronic apparatus 100 according to data storage purpose. For example, data for operating the electronic apparatus 100 may be stored in a memory embedded in the electronic apparatus 100, and data for an extended function of the electronic apparatus 100 may be stored in a memory detachable from the electronic apparatus 100.

The memory embedded in the electronic apparatus 100 may be implemented as at least one of a volatile memory (e.g., a dynamic RAM (DRAM), a static RAM (SRAM), a synchronous dynamic RAM (SDRAM), or the like), a non-volatile memory (e.g., one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive or a solid state drive (SSD), and the like, and the memory detachable from the electronic apparatus 100 may be implemented as a memory card (e.g., a compact flash (CF), secure digital (SD), a micro secure digital (Micro-SD), a (mini secure digital (Mini-SD), extreme digital (xD), a multi-media card (MMC), or the like), an external memory connectable to a USB port (e.g., a USB memory), and the like.

The communication interface 120 may be an element which communicates with various types of external apparatuses according to various types of communication methods. The communication interface 120 may include a Wi-Fi module, a Bluetooth module, an infrared communication module, a wireless communication module, and the like. Each communication module may be implemented as at least one hardware chip.

The Wi-Fi module and the Bluetooth module of the communication interface 120 may communicate by a Wi-Fi method and a Bluetooth method, respectively. When using the Wi-Fi module or the Bluetooth module, various pieces of connection information such as SSID or session key may be transmitted or received first to allow the communication connection by using these, and then various pieces of information may be transmitted and received.

The infrared communication module may perform communication according to a technology of infrared communication (infrared Data Association (IrDA)) for transmitting data in near field wirelessly by using infrared rays between visible rays and millimeter waves.

The wireless communication module may include at least one communication chip for performing communication according to various wireless communication standards such as zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the above communication method.

In addition, the communication interface 120 may include at least one of wireless communication modules for performing communication by using a local area network (LAN) module, an Ethernet module, pair cables, a coaxial cable, an optical fiber cable, or an ultra wide-band (UWB) module.

The processor 130 may perform general control operations of the electronic apparatus 100. Specifically, the processor 130 may perform a function of controlling general operations of the electronic apparatus 100.

The processor 130 may be implemented as a digital signal processor (DSP), a microprocessor, or a time controller (TCON) for processing digital signals. However, there is no limitation thereto, and the processor may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in form of a field programmable gate array (FPGA). The processor 130 may perform various functions by executing computer executable instructions stored in the memory 110.

The memory 110 may store a plurality of pieces of data using a distributed data storing method.

The communication interface 120 may be communicatively connected to the external apparatus 200.

When it is identified that first data corresponding to the external apparatus 200 among a plurality of pieces of data stored in the memory 110 is changed to second data, the processor 130 may change a state of the changed second data into a locked state, and control the communication interface 120 to transmit the second data in the locked state to the external apparatus 200 by a streaming method. The locked state may be a state where data is maintained without change according to a data change command.

The processor 130 may identify whether the plurality of pieces of data stored in the memory 110 are changed. The change of the plurality of pieces of data may identify whether a predetermined event occurs. The predetermined event may refer to an event in which data is replaced (or changed), an even in which data is deleted, or an event in which data is added. The event in which the data is replaced may refer to that the first data stored in advance is replaced with the second data. The event in which the data is deleted may refer to an event in which only the data stored in advance is deleted. The event in which the data is added may refer to an event in which the data stored in advance is not deleted and new data is added.

The processor 130 may generate change information by using an optimized row columnar (ORC) format or a parquet format. When data in the corresponding format is generated, the processor 130 may read this and identify whether the data is changed. The change information may include a change type and a change content of the data. When at least one piece of data among the plurality of pieces of data stored in the memory 110 is changed, the processor 130 may generate change information including detailed specific matters related to the change in an ORC format or a parquet format. When the change information in the corresponding format is generated, the processor 130 may identify whether the data is changed.

When the event in which the first data is replaced with the second data occurs, the processor 130 may delete the first data and change the state of the second data from an unlocked state into a locked state. The locked state may refer to a state where the data is unable to be modified (or deleted). However, although the data is in the locked state, only the modification of the data is unable to be performed, and the data in the locked state may be transmitted to the external apparatus 200. The unlocked state may refer to a state where the data is able to be modified (or deleted).

The streaming method may refer to a method for transmitting data as a data block of a predetermined unit, and the data block of a predetermined unit may be expressed as a stream. The streaming method may be used in a real-time data transmission technology of continuously transmitting data units in a small size. The processor 130 may transmit the second data to the external apparatus 200 by using the streaming method for transmitting the data as the data block of the predetermined unit.

When the event in which the first data is replaced with the second data is identified, the processor 130 may delete the first data, change the second data into the locked state, and transmit the second data to the external apparatus 200 by the streaming method.

When an event in which the first data is deleted without adding the second data occurs, the processor 130 may delete the first data from the memory 110 and generate a control signal for deleting the first data stored in the external apparatus 200. The processor 130 may transmit the generated control signal (for deleting the first data) to the external apparatus 200.

When an event in which the second data is added without deleting the first data occurs, the processor 130 may change the second data into the locked state, and transmit the second data in the locked state to the external apparatus 200.

The processor 130 may identify the change only for multiple pieces of data set as target data among the plurality of pieces of data stored in the memory 110. The target data may refer to data that needs to be synchronized. Specifically, when performing the synchronization with the external apparatus 200, the target data may refer to data that needs to be synchronized with the external apparatus 200 among the plurality of pieces of data stored in the memory 110. The external apparatus 200 may refer to at least one apparatus and each target data corresponding to the plurality of apparatuses may be different from each other.

The processor 130 may perform a synchronization operation according to a predetermined event. The predetermined event may be a predetermined cycle or a user input. For example, the synchronization operation may be performed every 10 minutes according to user setting or may be performed by receiving the user input.

In the synchronization of the electronic apparatus 100 and the external apparatus 200, it is necessary to determine which apparatus is the base of synchronization. In example embodiments shown in the drawings, the synchronization is performed with the electronic apparatus 100 as the base of the synchronization. However, according to other embodiments, the synchronization may be performed with the external apparatus 200 as the base of the synchronization, rather than the electronic apparatus 100.

According to an embodiment where the electronic apparatus 100 is the base of the synchronization, the processor 130 may transmit data stored only in the electronic apparatus 100 to the external apparatus 200. In addition, the processor 130 may transmit a control signal for deleting data stored only in the external apparatus 200 to the external apparatus 200.

According to an embodiment where the external apparatus 200 is the base of the synchronization, the processor 130 may delete the data stored only in the electronic apparatus 100. In addition, the processor 130 may request the external apparatus 200 for data stored only in the external apparatus 200. In response to the request of the electronic apparatus 100, the external apparatus 200 may transmit the data stored only in the external apparatus 200 to the electronic apparatus 100.

The processor 130 may use the structured query language (SQL) to access the data stored in the memory 110. However, in the SQL, an instruction for identifying a change of the data and transmitting only the changed data to outside may not be defined. Accordingly, the processor 130 may generate a separate control signal capable of directly accessing the memory 110 without using the SQL. In addition, the processor 130 may identify whether the plurality of pieces of data are changed based on the generated control signal.

The processor 130 may divide the second data in the locked state into a plurality of groups, each of which having a predetermined size unit, and control the communication interface 120 to transmit the plurality of divided groups to the external apparatus 200 by the streaming method.

The processor 130 may divide the second data into the plurality of groups in the predetermined size unit, change one group of the plurality of groups into the locked state, and control the communication interface 120 to transmit the one group in the locked state to the external apparatus 200.

A group in the predetermined size unit may be referred to as a unit group. In addition, the group in the predetermined size unit may be expressed as a block. A data unit and a block unit stored in the memory 110 may have a different size from the data unit or block to be transmitted.

When the second data is divided into a plurality of groups, the processor 130 may transmit each group to the external apparatus 200 in sequence. The processor 130 may change one group to be transmitted among the plurality of groups from the unlocked state into the locked state so that the group to be transmitted is not deleted during the transmission. In addition, the processor 130 may transmit one group that has been changed into the locked state.

When the transmission of the one group is completed, the processor 130 may change the state of the group of which is the transmission is completed, from the locked state to the unlocked state. The processor 130 may change a group other than the transmitted group from the unlocked state to the locked state, and transmit the group in the locked state to the external apparatus 200.

When all of the divided groups of the second data are transmitted, the external apparatus 200 may combine the received groups and store one piece of the second data in a memory of the external apparatus 200.

When the second data in the locked state is transmitted to the external apparatus 200, the processor 130 may change the second data in the locked state into the unlocked state, and the unlocked state may be a state where the data is changed according to the data change command.

When the data is changed into the unlocked state, the processor 130 may change the data based on a user input or a schedule generated in advance.

The processor 130 may, when a user input for deleting the second data among the plurality of pieces of data is received, generate a deletion request signal for deleting the second data, identify whether the second data is being transmitted to the external apparatus 200, when the second data is being transmitted to the external apparatus 200, change the second data into the unlocked state after completing the transmission of the second data, and delete the second data that is changed into the unlocked state from the memory 110 based on the generated deletion request signal.

According to an embodiment, a control command for deleting the second data may be received while the second data is already being transmitted. When the second data already being transmitted is deleted, an error may occur in the transmission operation or an error may occur in a compression operation of a received content. Accordingly, the processor 130 may change the data to bet transmitted into the locked state and change the data into the unlocked state again after the transmission.

When the processor 130 receives the user input for deleting the second data, the processor 130 may identify whether the second data is being transmitted, and if the second data is being transmitted, the processor may delete the second data after the completion of the transmission. Specifically, the processor 130 may change the second data from the locked state into the unlocked state after completing the transmission of the second data, and delete the second data that is changed into the unlocked state.

When the second data is deleted from the memory 110, the processor 130 may control the communication interface 120 to transmit the control signal for deleting the second data stored in the external apparatus 200 to the external apparatus 200.

In the following example, it is assumed that the electronic apparatus 100 and the external apparatus 200 are synchronized. When it is identified that the first data is changed to the second data, the processor 130 may transmit the second data to the external apparatus 200 so that the second data is also stored in the external apparatus 200. When the user input for deleting the second data is received while the second data is being transmitted, the second data is in the locked state while being transmitted, and accordingly, the second data is not deleted. Therefore, the processor 130 may delete the second data after completing the transmission of the entire second data to the external apparatus 200. In order to synchronize data between the electronic apparatus 100 and the external apparatus 200, the processor 130 may transmit the control signal for requesting the deletion of the second data to the external apparatus 200.

The processor 130 may receive identification information and a first data list for data stored in the external apparatus 200 from the external apparatus 200, obtain a second data list corresponding to the identification information of the external apparatus 200 among the plurality of pieces of data stored in the memory 110, identify whether the first data list is the same as the second data list by comparing the first data list with the second data list, based on the first data list being not the same as the second data list, generate a synchronization control command to set the first data list to be the same as the second data list, and control the communication interface 120 to transmit the generated synchronization control command to the external apparatus 200. The first data list and the second data list may be metadata lists including at least one of a name, a storage location, a data type, and a data size of each of a plurality of contents stored in the external apparatus 200.

The processor 130 may perform a data synchronization operation of the electronic apparatus 100 and the external apparatus 200. The processor 130 may receive the identification information and the data list (first data list) stored in the external apparatus from the external apparatus 200 for data synchronization.

The data list may be a list including at least one piece of data information and the data information may refer to metadata. The metadata may refer to data including brief information for the data, rather than original data.

The processor 130 may identify target data corresponding to the identification information of the external apparatus 200 based on the identification information received from the external apparatus 200. Specifically, the processor 130 may identify the target data to be synchronized with the external apparatus 200 among the plurality of pieces of data stored in the memory 110, and obtain metadata corresponding to the identified target data. The processor 130 may generate the data list (second data list) including the obtained metadata.

The processor 130 may compare the first data list related to the external apparatus 200 with the second data list related to the electronic apparatus 100.

The synchronization control command may refer to various commands for synchronizing data of the electronic apparatus 100 and the external apparatus 200. Specifically, the synchronization control command may be a data deletion command or a data transmission command (or data addition command). The data deletion command may include a command for deleting the data from the memory 110 of the electronic apparatus 100 and a command for deleting the data from the memory of the external apparatus 200. In addition, the data transmission command may be a command for the electronic apparatus 100 to transmit the data to the external apparatus 200, and may additionally include a command for transmitting the data to the external apparatus 200 and storing the data in the memory of the external apparatus 200.

When third data which is included in the second data list but not included in the first data list is identified, the processor 130 may control the communication interface 120 to transmit the identified third data to the external apparatus 200.

When data which is stored in the electronic apparatus 100 but not stored in the external apparatus 200 (third data) is identified, the processor 130 may transmit the corresponding data (third data) to the external apparatus 200.

When fourth data which is not included in the second data list but included in the first data list is identified, the processor 130 may control the communication interface 120 to transmit a control command for deleting the identified fourth data to the external apparatus 200.

When data which is stored in the external apparatus 200 but not stored in the electronic apparatus 100 (fourth data) is identified, the processor 130 may generate a control signal for deleting the data (fourth data) stored only in the external apparatus 200 from the memory of the external apparatus 200 and transmit the control signal to the external apparatus 200.

The memory 110 may be a database accessible by the SQL.

The processor 130 may access the memory 110 that uses the SQL by using a separate control signal rather than the SQL. For example, when there is no instruction for determining only a change of data in the SQL, the processor may access the memory 110 by using a separate control code rather than the SQL. The separate control code may be a predetermined code and expressed in various languages. According to an embodiment, the control code may include some SQL defined in advance. The processor 130 may identify whether the data is changed in the database accessible by the SQL. Specifically, the processor 130 may obtain metadata of the data stored in the database. The metadata may include at least one of a name, a storage location, a data type, and a data size.

The synchronization according to an embodiment may be performed in both directions. The processor 130 may compare the data stored in the memory 110 with the data stored in the external apparatus 200. In the above description, the embodiment in which the synchronization is performed in both directions so that complete consistency is established between the data of the electronic apparatus 100 and the external apparatus 200 has been described.

The synchronization according to another embodiment may be performed in a single direction rather than both directions. The electronic apparatus 100 may not recognize the data changed in the external apparatus 200 and only the data changed in the electronic apparatus 100 may be transmitted to the external apparatus 200. For example, when the first data is deleted from the electronic apparatus 100, the processor 130 may transmit a control signal for deleting the first data from the external apparatus 200 to the external apparatus 200. On the other hand, although the first data is deleted from the external apparatus 200, the electronic apparatus 100 may not recognize whether the first data is deleted from the external apparatus 200.

The electronic apparatus 100 may transmit only the changed data to the external apparatus 200 by the streaming method, and accordingly, the overlapped data may not be transmitted. Accordingly, the electronic apparatus 100 may reduce the amount and the time required for the data transmission. In addition, general network cost may also be reduced. Further, since the comparison operation using the metadata is performed to transmit only the changed data, the real-time analysis may be smoothly performed by the data transmission by the streaming method.

The above embodiments are illustrated and described regarding only the brief configuration of the electronic apparatus 100, but in the implementation, various constituent elements may be additionally provided.

Figure 3:
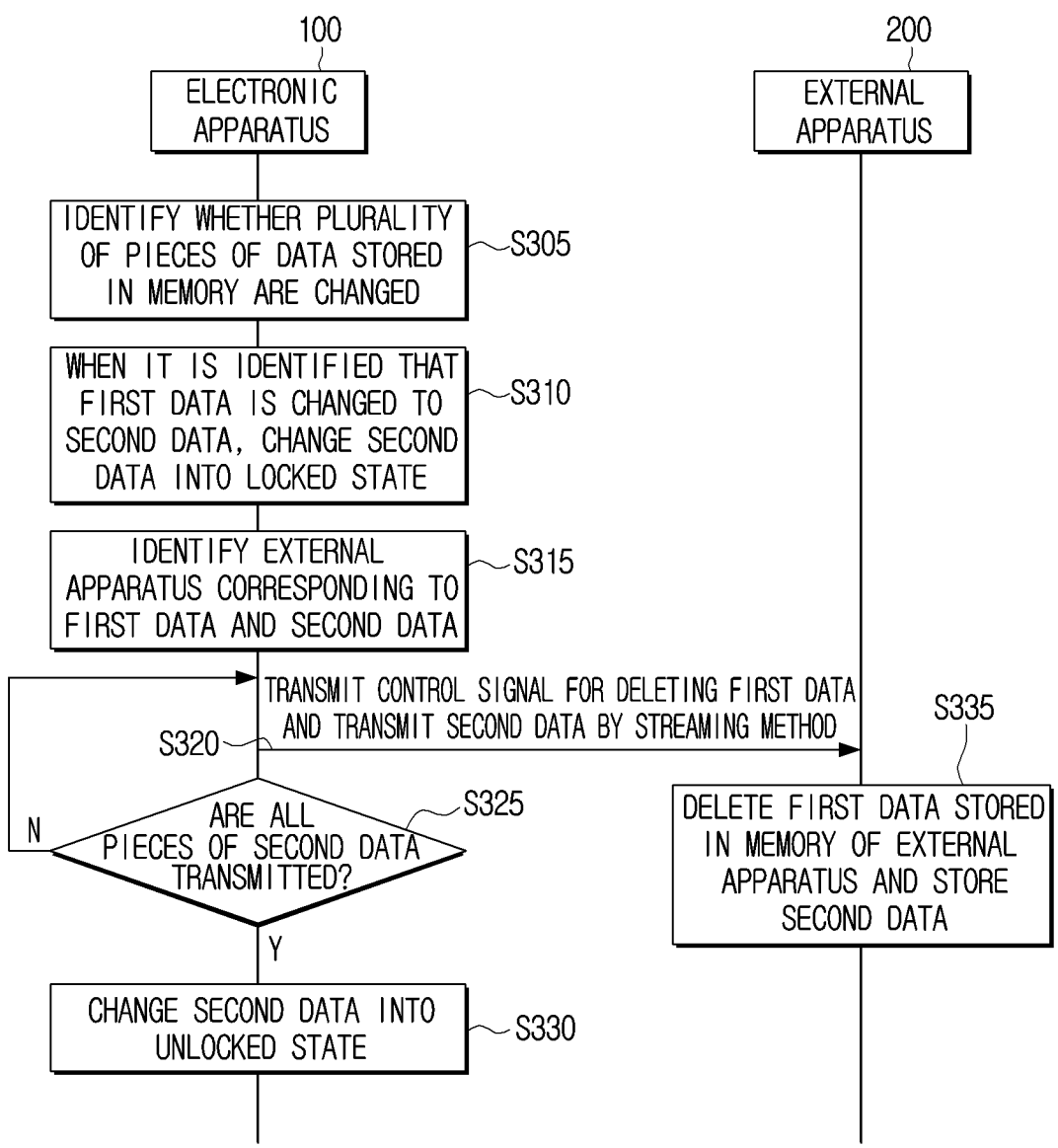
FIG. 3 is a diagram of a data transmission operation according to an embodiment.

FIG. 3 is a diagram of a data transmission operation according to an embodiment.

Referring to FIG. 3, the electronic apparatus 100 may identify whether any of the plurality of pieces of data stored in the memory 110 are changed (S305). The memory 110 may store the plurality of pieces of data. The plurality of pieces of data may be a plurality of pieces of data corresponding to at least one of external apparatuses.

For example, it is assumed that data stored in a first external apparatus is first to tenth data, and data stored in a second external apparatus is eleventh data to twentieth data. The first external apparatus and the second external apparatus may upload data stored in each memory on the electronic apparatus 100. The electronic apparatus 100 may receive and store the first data to the tenth data from the first external apparatus and receive and store the eleventh data to the twentieth data from the second external apparatus.

The first data to the tenth data stored in the memory 110 of the electronic apparatus 100 may be data corresponding to the first external apparatus, and the eleventh data to the twentieth data may be data corresponding to the second external apparatus.

The electronic apparatus 100 may identify whether there is changed data among the plurality of pieces of data stored in the memory 110. The change herein may include not only a change of data itself, but also include all of a modification of a content included in data, a modification of a size, and the like. For example, the data change may be a content name change, a content size change, a content type change, addition (or change or deletion) of a content, or the like.

When it is identified that the first data stored in the memory 110 of the electronic apparatus 100 is changed to the second data, the second data may be changed into the locked state (S310). The locked state may be a state where the data is not modified or deleted. Accordingly, the second data may not be modified or deleted in the locked state.

The electronic apparatus 100 may identify the external apparatus corresponding to the first data and the second data (S315). As described above, for each data, the apparatus corresponding to each data may be determined in advance. Herein, it is assumed that the apparatus corresponding to the first data (data before change) and the second data (data after change) is the external apparatus 200.

The electronic apparatus 100 may transmit the control signal for deleting the first data and transmit the second data to the external apparatus 200 by the streaming method (S320). The electronic apparatus 100 may delete the first data stored in the external apparatus 200 and transmit the control signal for storing the second data to the external apparatus 200. The electronic apparatus 100 may divide the second data into unit groups having a predetermined size and transmit each unit group to the external apparatus 200.

The electronic apparatus 100 may identify whether all pieces of the second data are transmitted (S325). When it is identified that all pieces of the second data are transmitted (S325—Y), the electronic apparatus 100 may change the second data into the unlocked state. When it is identified that all pieces of the second data are not transmitted (S325—N), the electronic apparatus 100 may continuously transmit the second data by the streaming method.

In response to receiving the control signal for deleting the first data and the transmission of the second data, external apparatus 200 may delete the first data stored in the memory of the external apparatus 200 and store the second data (S335). Specifically, the external apparatus 200 may delete the first data based on the control signal for deleting the first data. The external apparatus 200 may store the second data received by the streaming method to the memory of the external apparatus 200. Since the second data is transmitted as unit groups, the received unit groups may be stored in order.

Figure 4:
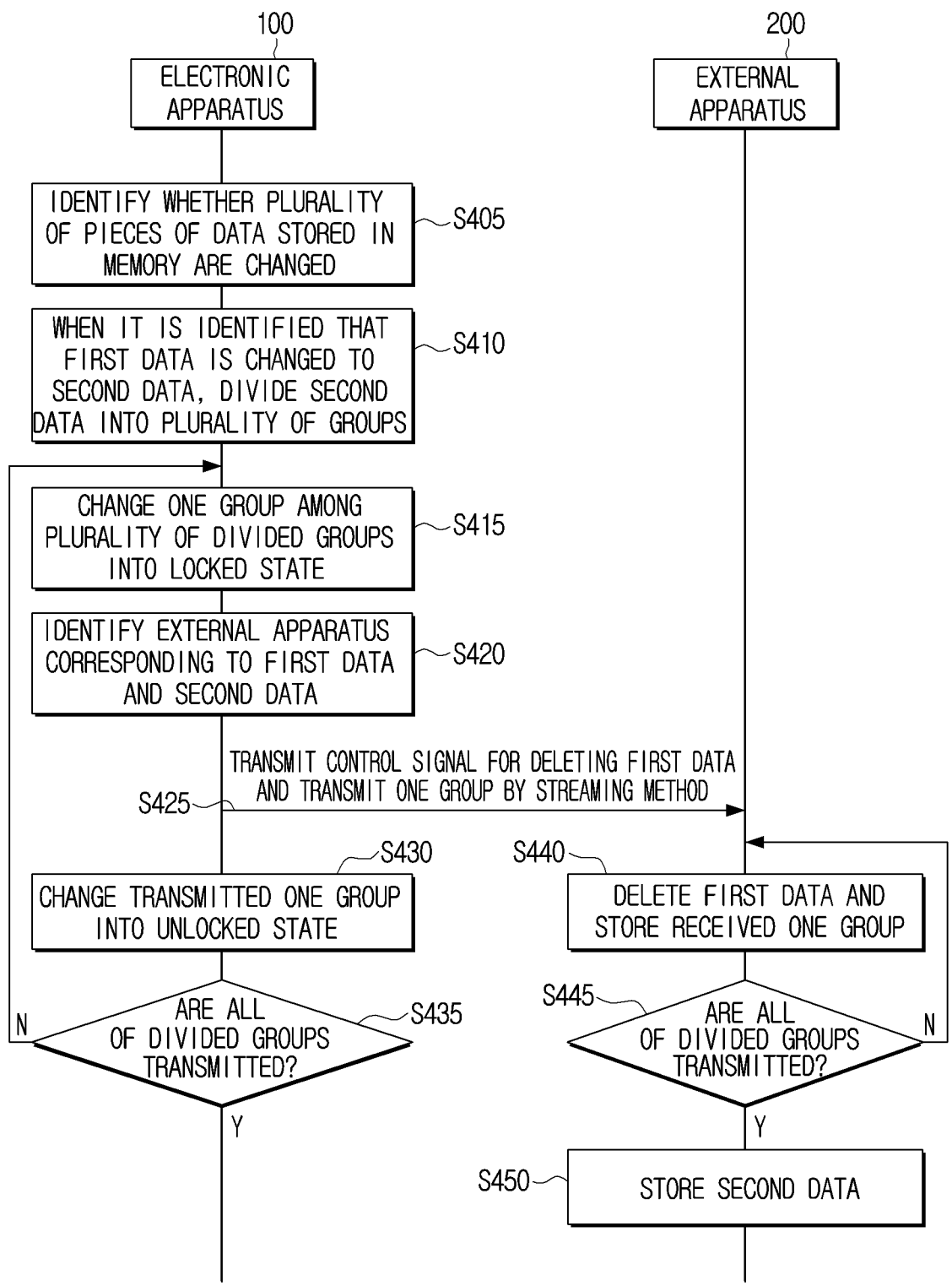
FIG. 4 is a diagram of the data transmission operation according to another embodiment.

FIG. 4 is a diagram of the data transmission operation according to another embodiment.

Referring to FIG. 4, the electronic apparatus 100 may identify whether any of the plurality of pieces of data stored in the memory 110 are changed (S405). The operation S405 may correspond to the operation S305 of FIG. 3.

When it is identified by the electronic apparatus 100 that first data is changed to second data, the electronic apparatus 100 may divide the second data into a plurality of groups (S410). One group may be a unit group and may refer to a data group having a predetermined size. For example, if the predetermined size is 1 MB, the data having a size of 100 MB may be divided into 100 groups.

The electronic apparatus 100 may change one group among the plurality of groups into the locked state (S415). The group changed into the locked state may be unable to be modified or deleted.

The electronic apparatus 100 may identify an external apparatus corresponding to the first data and the second data (S420). The operation S420 may correspond to the operation S315 of FIG. 3. It is assumed that the apparatus corresponding to the first data and the second data is the external apparatus 200.

The electronic apparatus 100 may transmit the control signal for deleting the first data to the external apparatus 200 and transmit the one group in the locked state to the external apparatus 200 by the streaming method (S425).

The electronic apparatus 100 may change the one group transmitted to the external apparatus 200 from the locked state into the unlocked state (S430). The one group changed into the unlocked state may be able to be modified or deleted.

The electronic apparatus 100 may identify whether all of the divided groups are transmitted (S435). All of the divided groups herein may refer to divided groups of the second data. When it is identified that all of the divided groups of the second data are transmitted to the external apparatus 200 (S435—Y), the electronic apparatus 100 may disconnect the communication with the external apparatus 200.

When it is identified that all of the divided groups of the second data are not transmitted to the external apparatus 200 (S435—N), the operations S415, S420, S425, S430, and S435 may be repeated until all groups are transmitted.

When the control signal for deleting the first data and one group are received according to the operation S425, the external apparatus 200 may delete the first data and store the received one group in the memory of the external apparatus 200 (S440).

The external apparatus 200 may determine whether all of the divided groups are transmitted (S445). When it is identified that all of the divided groups are transmitted (S445—Y), the external apparatus 200 may combine the plurality of stored groups and store one piece of the second data in the memory of the external apparatus 200 (S450). When it is identified that all of the divided groups are not transmitted (S445—N), the external apparatus 200 may continuously receive the groups from the electronic apparatus 100 until all groups are transmitted.

Figure 5:
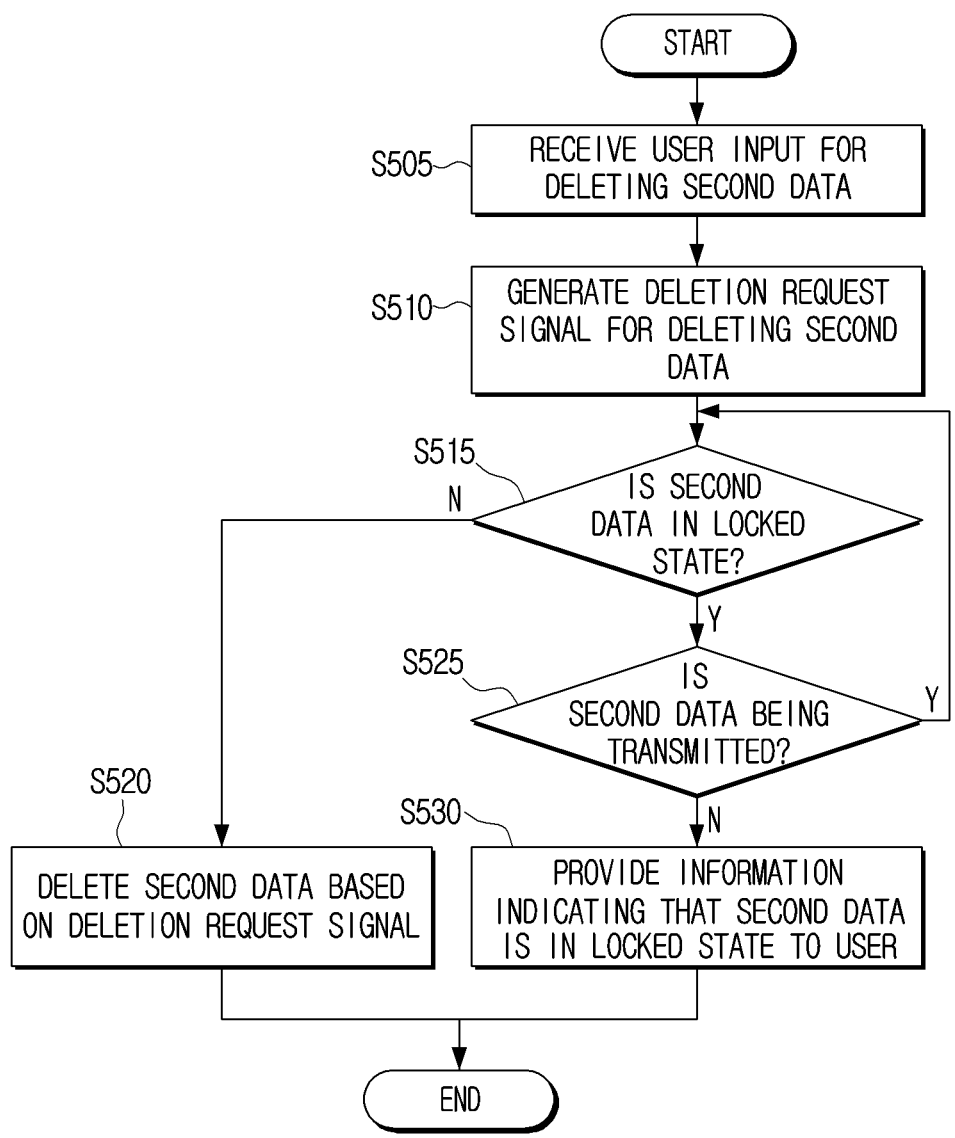
FIG. 5 is a flowchart of a data deletion operation according to an embodiment.

FIG. 5 is a flowchart of a data deletion operation according to an embodiment.

Referring to FIG. 5, the electronic apparatus 100 may receive a user input for deleting the second data (S505). The user input may refer to a control command. Accordingly, the electronic apparatus 100 may proceed to the deletion process of the second data based on the control command for deleting the second data.

The electronic apparatus 100 may generate a deletion request signal for deleting the second data (S510). Although the deletion request signal is generated, the electronic apparatus 100 may not immediately delete the second data.

Specifically, the electronic apparatus 100 may identify whether the second data is in the locked state (S515). When the second data is not in the locked state (S515—N), the electronic apparatus 100 may immediately delete the second data based on the deletion request signal (S520).

When the second data is in the locked state (S515—Y), the electronic apparatus may identify whether the second data is being transmitted (S525). When it is identified that the second data is being transmitted (S525—Y), the electronic apparatus 100 may repeatedly perform the operations S515 and S525 until the second data is changed into the unlocked state.

When it is identified that the second data is not being transmitted (S525—N), the electronic apparatus 100 may provide information indicating that the second data is in the locked state to the user (S530). If the second data is in the locked state but is not being transmitted, the second data may be determined as data that is unable to be deleted. Accordingly, the electronic apparatus 100 may provide information indicating that the second data in the locked state is unable to be deleted, although the second data is not being transmitted, to the user.

Figure 6:
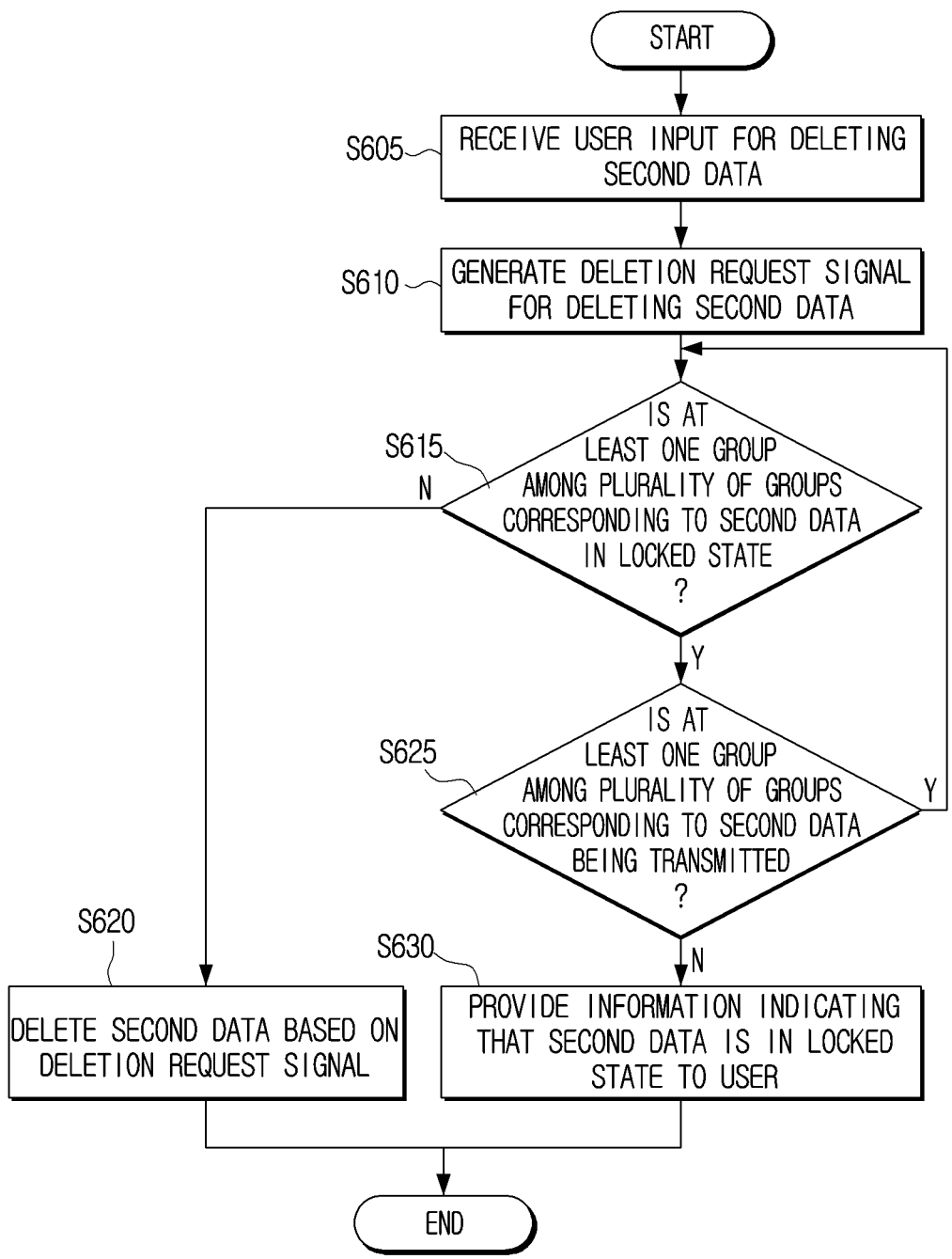
FIG. 6 is a flowchart of the data deletion operation according to another embodiment.

FIG. 6 is a flowchart illustrating the data deletion operation according to another embodiment.

Referring to FIG. 6, the electronic apparatus 100 may receive a user input for deleting the second data (S605). The electronic apparatus 100 may generate the deletion request signal for deleting the second data (S610). The operations S605 and S610 may correspond to the operations S505 and S510.

The electronic apparatus 100 may identify whether at least one group among a plurality of groups corresponding to the second data is in the locked state (S615). When the at least one group among the plurality of groups corresponding to the second data is not in the locked state (S615—N), the electronic apparatus 100 may delete the second data based on the deletion request signal (S620). That is, when all of the plurality of groups corresponding to the second data are in the unlocked state, the electronic apparatus 100 may delete the second data.

When at least one group among the plurality of groups corresponding to the second data is in the locked state (S615—Y), the electronic apparatus 100 may identify whether the at least one group among the plurality of groups corresponding to the second data is being transmitted (S625). When it is identified that the at least one group among the plurality of groups corresponding to the second data is being transmitted (S625—Y), the electronic apparatus 100 may repeatedly perform the operations S615 and S625 until the second data is changed into the unlocked state.

When the at least one group among the plurality of groups corresponding to the second data is not being transmitted (S625—N), the electronic apparatus 100 may provide information indicating that the second data is in the locked state to the user. If the at least one group of the second data is in the locked state but is not being transmitted, the second data may be determined as data that is unable to be deleted. Accordingly, the electronic apparatus 100 may provide information indicating that the second data in the locked state is unable to be deleted, although the second data is not being transmitted, to the user.

Figure 7:
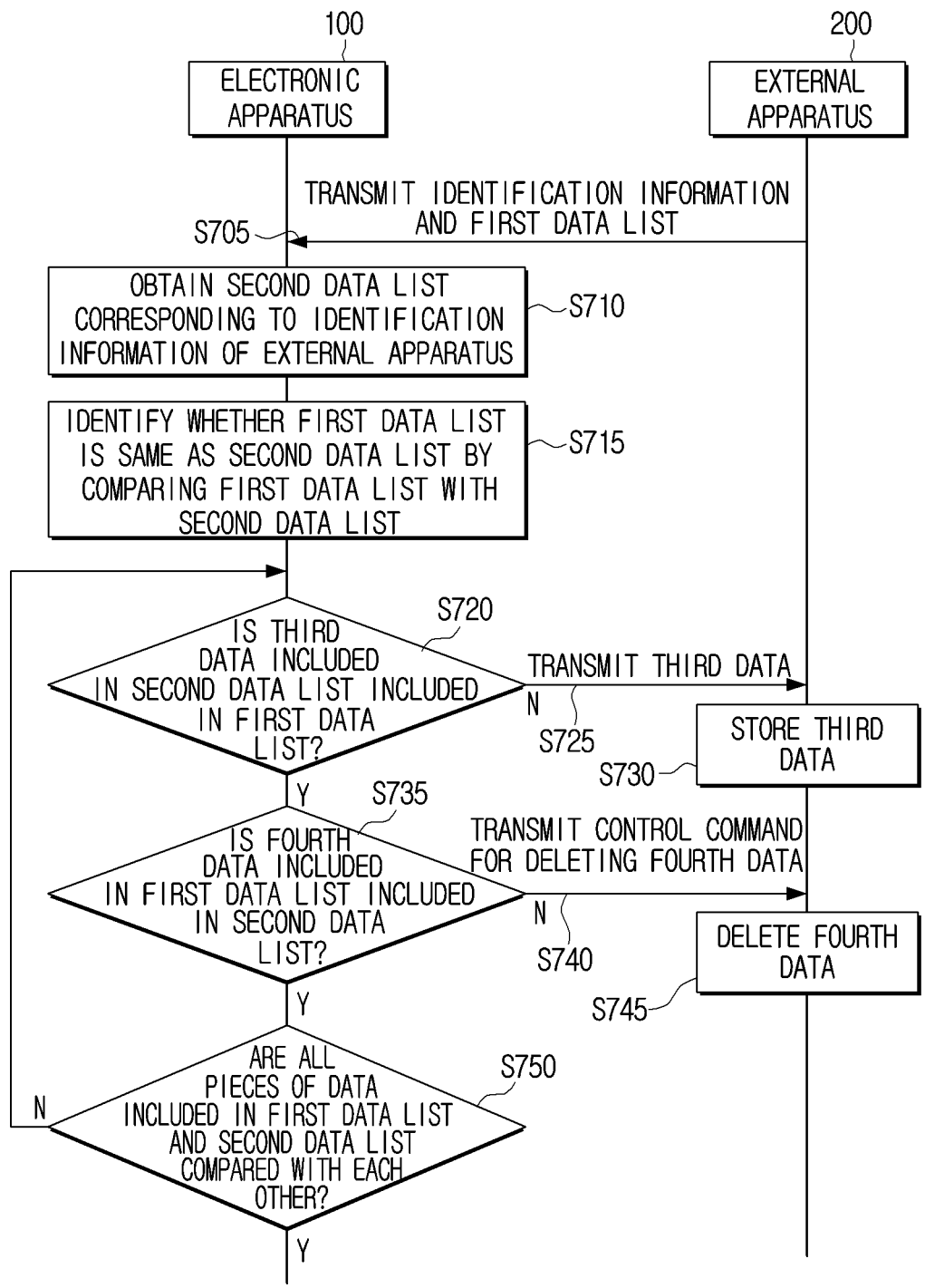
FIG. 7 is a flowchart of a data comparison operation of the electronic apparatus and an external apparatus.

FIG. 7 is a diagram of a data comparison operation of the electronic apparatus and the external apparatus.

Referring to FIG. 7, the external apparatus 200 may transmit identification information and a first data list of the external apparatus 200 to the electronic apparatus 100. The identification information of the external apparatus 200 may refer to information for specifying the external apparatus 200. For example, the identification information of the external apparatus 200 may refer to unique model information, name information set by the user, and the like of the external apparatus 200. The first data list may refer to information corresponding to the data stored in the external apparatus 200. The data list merely includes only brief information related to the data and may not include the data itself.

For example, it is assumed that the external apparatus 200 stores ten documents. The data list may include at least one piece of information among a name of the document, a format of the document, a program corresponding to the document, and a written date of the document.

The electronic apparatus 100 may obtain (or identify) the second data list corresponding to the identification information of the external apparatus 200 (S710). The electronic apparatus 100 may store the plurality of pieces of data in the memory 110. The electronic apparatus 100 may refer to a database server, and accordingly, the electronic apparatus 100 may store data corresponding to each of the plurality of external apparatuses.

When the identification information is received from the external apparatus 200, the data corresponding to the identification information of the external apparatus 200 may be searched. The electronic apparatus 100 may generate one list of all pieces of searched data. The generated list may be the second data list. Accordingly, the first data list may be a list stored in the external apparatus 200 and the second data list may be a list of data corresponding to the external apparatus 200 among the plurality of pieces of data stored in the electronic apparatus 100.

The electronic apparatus 100 may identify whether the first data list is the same as the second data list by comparing the first data list with the second data list (S715). Specifically, the electronic apparatus 100 may identify whether the data corresponding to the external apparatus 200 among the plurality of pieces of data stored in the electronic apparatus 100 matches to the data actually stored in the external apparatus 200.

The electronic apparatus 100 may identify whether third data included in the second data list is included in the first data list (S725). When at least one piece of data (third data) included in the second data list is not included in the first data list (S720—N), the electronic apparatus 100 may transmit the at least one piece of data (third data) to the external apparatus 200 (S725). The external apparatus 200 may store the at least one piece of data (third data) received from the electronic apparatus 100 (S730). Before performing the operation S725, the electronic apparatus 100 may change the at least one piece of data (third data) determined to be transmitted into the locked state.

When the at least one piece of data (third data) included in the second data list is included in the first data list (S720—Y), the electronic apparatus may identify whether at least one piece of data (fourth data) included in the first data list is included in the second data list (S735). When the at least one piece of data (fourth data) included in the first data list is not included in the second data list (S735—N), the electronic apparatus 100 may transmit a control command for deleting the at least one piece of data (fourth data) to the external apparatus 200 (S740). Specifically, the electronic apparatus 100 may generate a control command and transmit the control command to the external apparatus 200 to delete data which is not stored in the electronic apparatus 100 but stored only in the external apparatus 200.

The external apparatus 200 may delete the at least one piece of data (fourth data) stored in the external apparatus 200 based on the control command for deleting the at least one piece of data (fourth data) received from the electronic apparatus 100 (S745).

When the at least one piece of data (fourth data) included in the first data list is included in the second data list (S735—Y), the electronic apparatus 100 may identify whether all pieces of data included in the first data list and the second data list are compared with each other (S750). When all pieces of data are compared with each other (S750—Y), the electronic apparatus 100 may end the synchronization operation. When all pieces of data are not compared with each other (S750—N), the electronic apparatus 100 may repeatedly perform the operations S720 to S750 until all pieces of data are compared with each other.

As a result, the electronic apparatus 100 may perform the synchronization operation for matching the data stored in the electronic apparatus 100 to the data stored in the external apparatus 200. Herein, the base of the synchronization may be the electronic apparatus 100. However, there is no limitation thereto, and the external apparatus 200 may be the base of synchronization according to the user setting.

According to an embodiment, when the electronic apparatus 100 is the base of the synchronization, if the data stored in the electronic apparatus 100 is not in the external apparatus 200, the electronic apparatus 100 may transmit the corresponding data to the external apparatus 200. When the data which is not stored in the electronic apparatus 100 but stored only in the external apparatus 200 is identified, the electronic apparatus 100 may transmit a control signal for deleting the data stored only in the external apparatus 200 to the external apparatus 200.

According to an embodiment, when the external apparatus 200 is the base of the synchronization, if the data stored in the electronic apparatus 100 is not in the external apparatus 200, the electronic apparatus 100 may delete the data stored only in the electronic apparatus 100. When the data which is not stored in the electronic apparatus 100 but stored only in the external apparatus 200 is identified, the electronic apparatus 100 may transmit a control signal for requesting for the data stored only in the external apparatus 200 to the external apparatus 200. The external apparatus 200 may transmit the data stored only in the external apparatus 200 to the electronic apparatus 100 in response to the data request signal.

Figure 8:
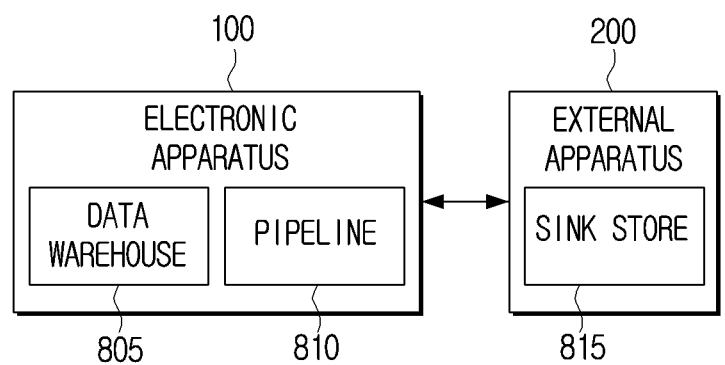
FIG. 8 is a block diagram showing a relationship between a data warehouse, a pipeline, and a sink store according to an embodiment.

FIG. 8 is a diagram showing a relationship between a data warehouse, a pipeline, and a sink store according to an embodiment.

Referring to FIG. 8, the electronic apparatus 100 may include a data warehouse 805 and a pipeline 810.

The data warehouse 805 may refer to a device or a module which stores a plurality of pieces of data. Specifically, the data warehouse 805 may store a plurality of pieces of data and may store data corresponding to the external apparatus 200. The data warehouse 805 may refer to a storage device on which the data stored in the external apparatus 200 is loaded. The electronic apparatus 100 may synchronize the data with the external apparatus 200 and the data stored in the external apparatus 200 may also be stored in the data warehouse 805 of the electronic apparatus 100.

The pipeline 810 may be a device or a module which manage data synchronization of the electronic apparatus 100 and the external apparatus 200. Specifically, the pipeline 810 may determine whether the data is synchronized by comparing the data stored in the data warehouse 805 with the data stored in a sink store 815 of the external apparatus 200.

The pipeline 810 may proceed the synchronization based on the electronic apparatus 100 or the external apparatus 200. In an example, when the synchronization is performed based on the electronic apparatus 100, the pipeline 810 may transmit specific data stored only in the data warehouse 805 or transmit a request for deleting the data stored only in the sink store 815 to the external apparatus 200. In another example, when the synchronization is performed based on the external apparatus 200, the external apparatus 200 may delete the data stored only in the data warehouse 805 and request the external apparatus 200 for the data stored only in the sink store 815.

The external apparatus 200 may include the sink store 815.

The sink store 815 may refer to a device or a module which stores the data stored in the external apparatus 200.

Figure 9:
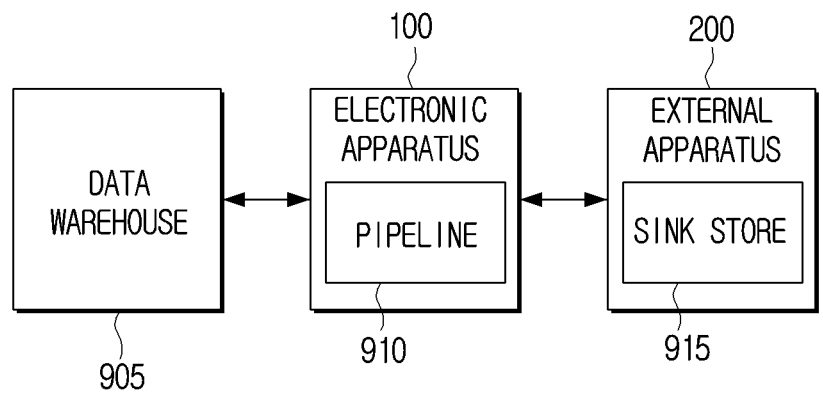
FIG. 9 is a block diagram showing a relationship between a data warehouse, a pipeline, and a sink store according to another embodiment.

FIG. 9 is a diagram showing a relationship between a data warehouse, a pipeline, and a sink store according to another embodiment.

Referring to FIG. 9, a data warehouse 905 may not be included in the electronic apparatus 100 and may be implemented as a separate external server. Specifically, the electronic apparatus 100 may include a pipeline 910 and the external apparatus 200 may include a sink store 915. The data warehouse 905 may be implemented as a separate external storage device.

The other description is the same as in FIG. 8, and therefore the overlapped description will not be repeated.

Figure 10:
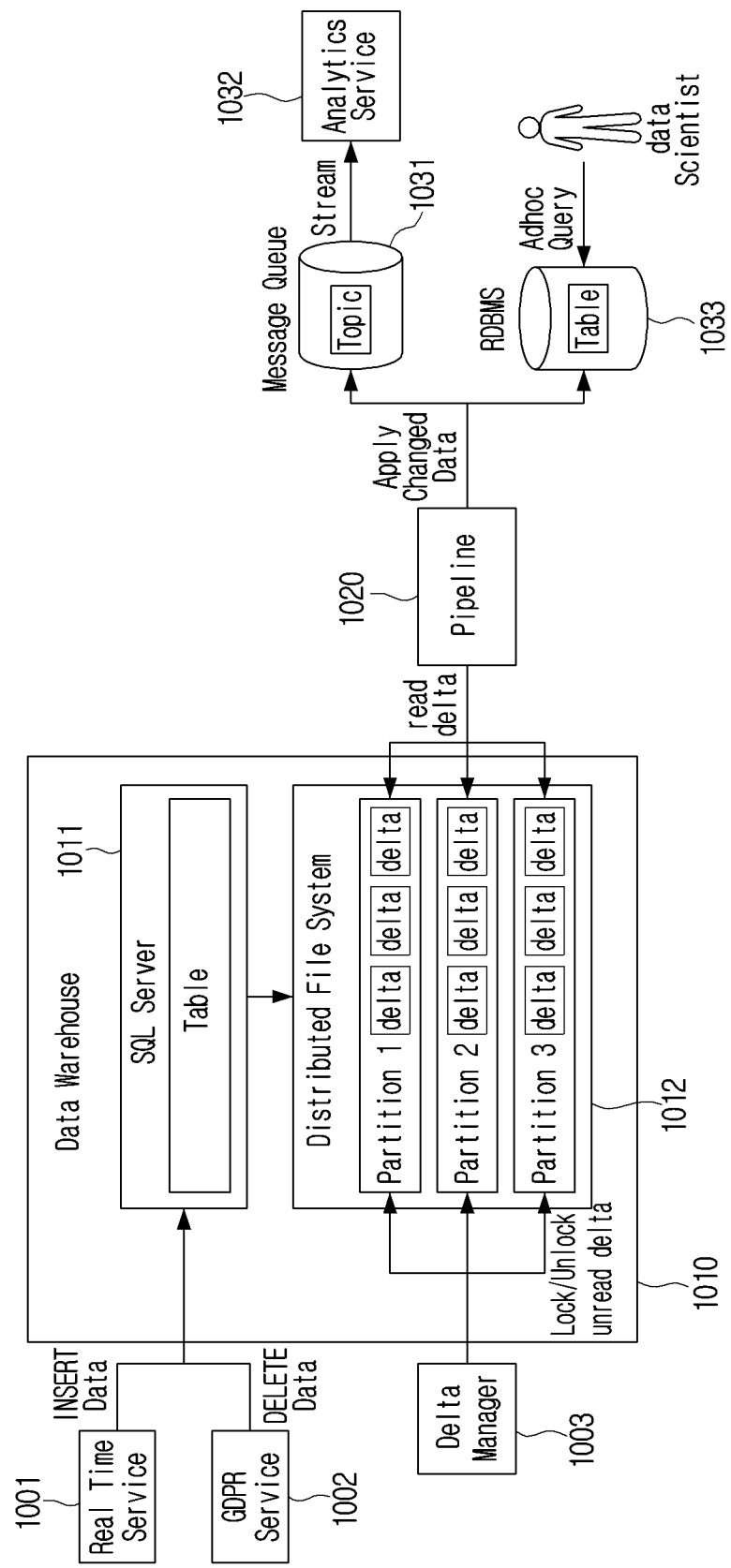
FIG. 10 is a diagram of a system for performing the data transmission operation according to an embodiment.

FIG. 10 is a diagram showing a system for performing the data transmission operation according to an embodiment.

Referring to FIG. 10, a data warehouse 1010 may include a SQL server 1011 and a distributed file system 1012.

The SQL server 1011 may be a server which controls data stored in the distributed file system 1012. Specifically, the SQL server 1011 may transmit control commands for reading, writing, storing, changing, deleting, transmitting, and the like to the distributed file system 1012.

In addition, the SQL server 1011 may receive data from a real time service server 1001. The real time service server 1001 may refer to a server which provides data to the data warehouse 1010, and the provided data may be stored in the distributed file system 1012. The data stored in the distributed file system 1012 may be transmitted to external sink stores 1031 and 1033 through a pipeline 1020.

In addition, the SQL server 1011 may receive information related to General Data Protection Regulation (GDPR) policy from a GDPR service server 1002. The information related to the GDPR policy may be a control command for deleting specific data. When the information related to the GDPR policy is received from the GDPR service server 1002, the SQL server 1011 may generate a control signal to delete data corresponding to the received information. In addition, the SQL server 1011 may delete data (data corresponding to the information related to the GDPR policy) stored in the distributed file system 1012 based on the generated control signal.

The distributed file system 1012 may be configured with a plurality of partitions and each partition may store at least one piece of data.

A data manager 1003 may control states of a plurality of pieces of data stored in the distributed file system 1012. For example, the data manager 1003 may change at least one piece of data among the plurality of pieces of data stored in the distributed file system 1012 into the locked state or the unlocked state. For example, when transmitting specific data, the data manager 1003 may change the data to be transmitted from the unlocked state into the locked state. In addition, when all pieces of data are transmitted, the data manager 1003 may change the data from the locked state into the unlocked state.

The pipeline 1020 may determine whether the data stored in the data warehouse 1010 is changed. The pipeline 1020 may identify the changed data among the plurality of pieces of data stored in the distributed file system 1012 and receive change information. In addition, the pipeline 1020 may perform the synchronization with the external sink stores 1031 and 1033 based on the change information.

In an example, the external sink store 1031 may be a storage module included in a message storage space device. The external sink store 1031 may store messages by dividing the messages according to topics. The data stored in the external sink store 1031 may transmit a stream (or data or message) to an analytics service server 1032.

In another example, the external sink store 1033 may be a storage module included in a relational database management system (RDBMS). The external sink store 1033 may receive an ad hoc query from an external manager.

The pipeline 1020 may confirm whether the plurality of pieces of data stored in the data warehouse 1010 are changed, and when the plurality of pieces of data are changed, the pipeline 1020 may synchronize the change information in the external sink stores 1031 and 1033. For example, when there is a change of adding data, the pipeline 1020 may transmit a control signal for deleting original data and the added data to the external sink stores 1031 and 1033. In addition, when there is a change of deleting data, the pipeline 1020 may transmit only a control signal for deleting the original data to the external sink stores 1031 and 1033.

The data warehouse 1010 may generate change information by using an ORC format or a parquet format. When the data in the corresponding format is generated, the pipeline 1020 may read this and identify whether the data is changed. The change information may include a change type and a change content of the data.

In the data warehouse 1010, a path may be set in a partition unit in advance. In addition, the data warehouse 1010 may proceed a process of performing file compaction in the partition unit for optimization of a number of files and data size.

Figure 11:
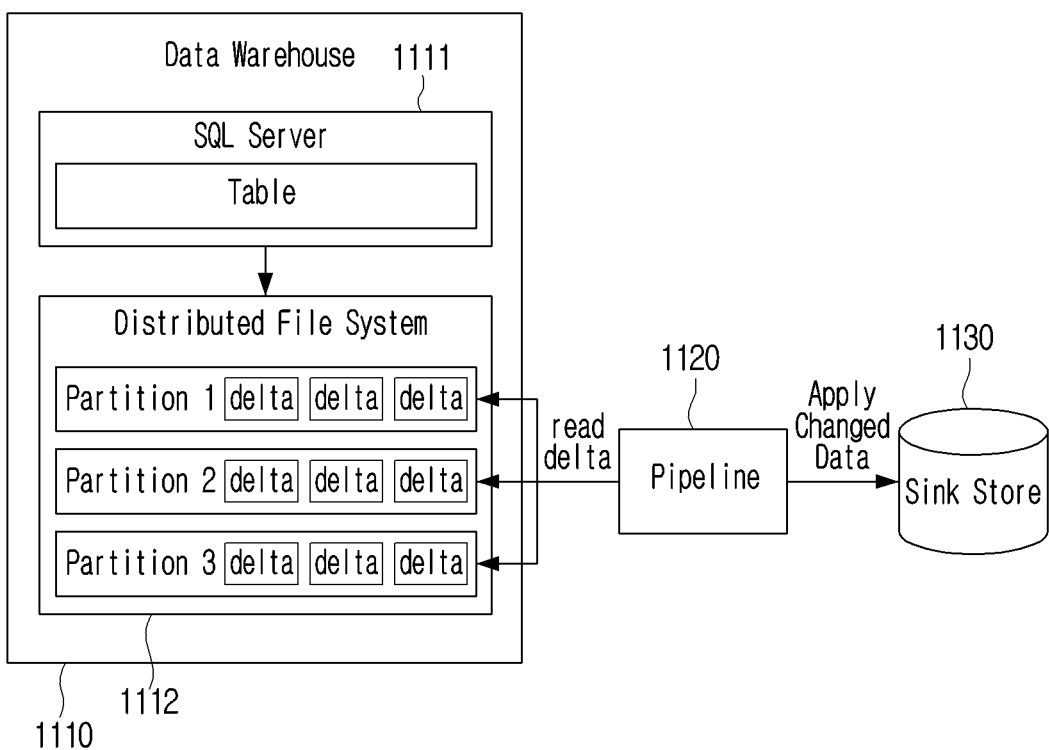
FIG. 11 is a diagram showing an operation in which a system including a data warehouse, a pipeline, and a sink store changes data according to an embodiment.
Figure 12:
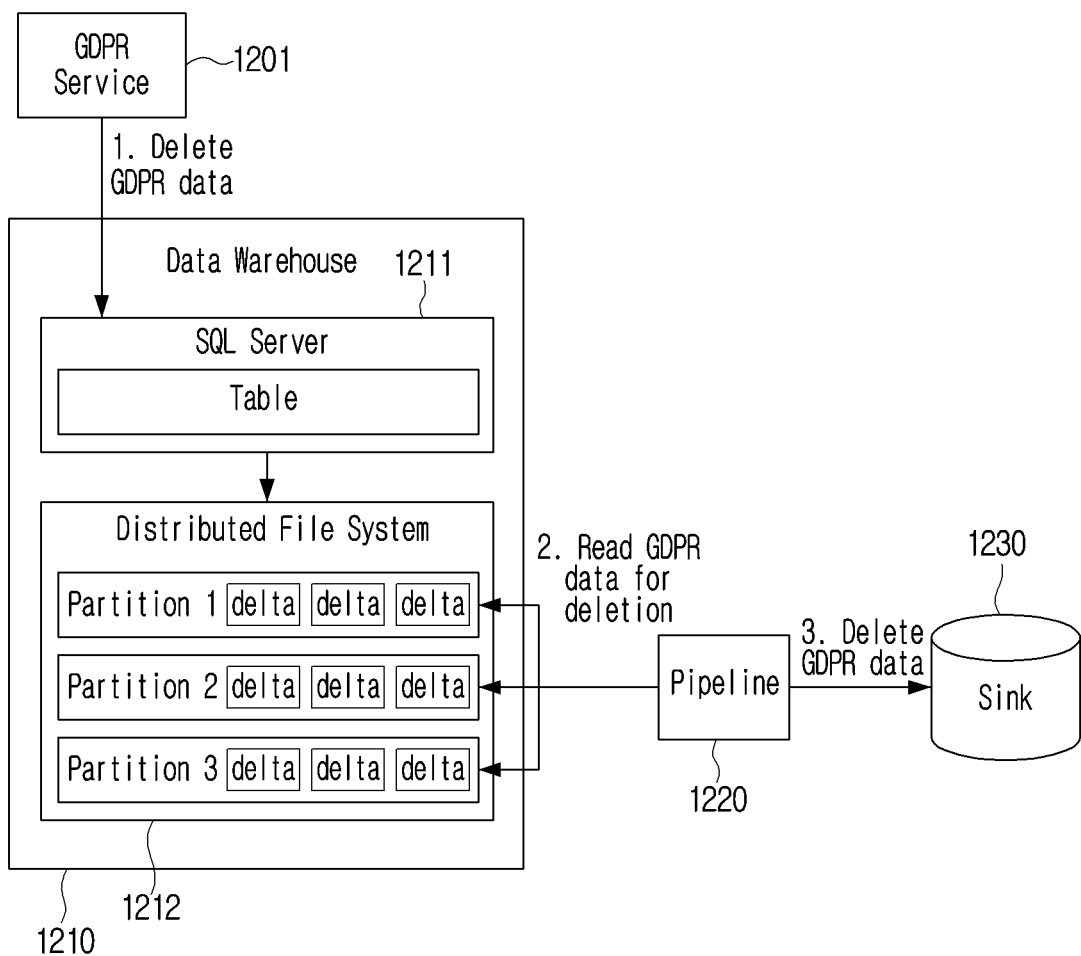
FIG. 12 is a diagram showing an operation in which a system including a data warehouse, a pipeline, and a sink store deletes data according to an embodiment.

Delta shown in FIGS. 10 to 12 may refer to data or a data block.

FIG. 11 is a diagram showing an operation in which a system including a data warehouse, a pipeline, and a sink store changes data according to an embodiment.

Referring to FIG. 11, a data warehouse 1110 may include an SQL server 1111 and a distributed file system 1112.

The pipeline 1120 may communicate with the distributed file system 1112 included in the data warehouse 1110. Specifically, the pipeline 1120 may determine whether a plurality of pieces of data stored in the distributed file system 1112 are changed. Specifically, the pipeline 1120 may be able to access the data from the distributed file system 1112. When it is identified that the data are changed, the pipeline 1120 may apply the changed data to a sink store 1130.

FIG. 12 is a diagram showing an operation in which a system including a data warehouse, a pipeline, and a sink store deletes data according to an embodiment.

Referring to FIG. 12, a data warehouse 1210 may include an SQL server 1211 and a distributed file system 1212.

The SQL server 1211 may receive a control signal (or control command) for deleting specific data from a GDPR service server 1201. In addition, the SQL server 1211 may control the distributed file system 1212 to delete data corresponding to the received control signal among the data stored in the distributed file system 1212 based on the received control signal.

A pipeline 1220 may determine whether the data is changed by accessing the distributed file system 1212. In addition, the pipeline 1220 may identify the specific data is deleted based on the control signal according to the GDPR. The pipeline 1220 may control so that the data deleted according to the GDPR in the distributed file system 1212 is also deleted from a sink store 1230. Specifically, the pipeline 1220 may identify the deleted data and transmit a deletion request to the sink store 1230. The sink store 1230 may delete the data requested to be deleted according to the GDPR in response to the deletion request, and transmit result information on the deletion operation to the pipeline 1220.

According to the embodiment of FIG. 12, when deleting the data according to the GDPR policy, the data warehouse 1210 does not need to read the entire data and overwrite the data on the original data, but is able to apply only the changed data in real time. Accordingly, using the system, it is possible to prevent overlapped data transmission and reduce the required time.

Figure 13:
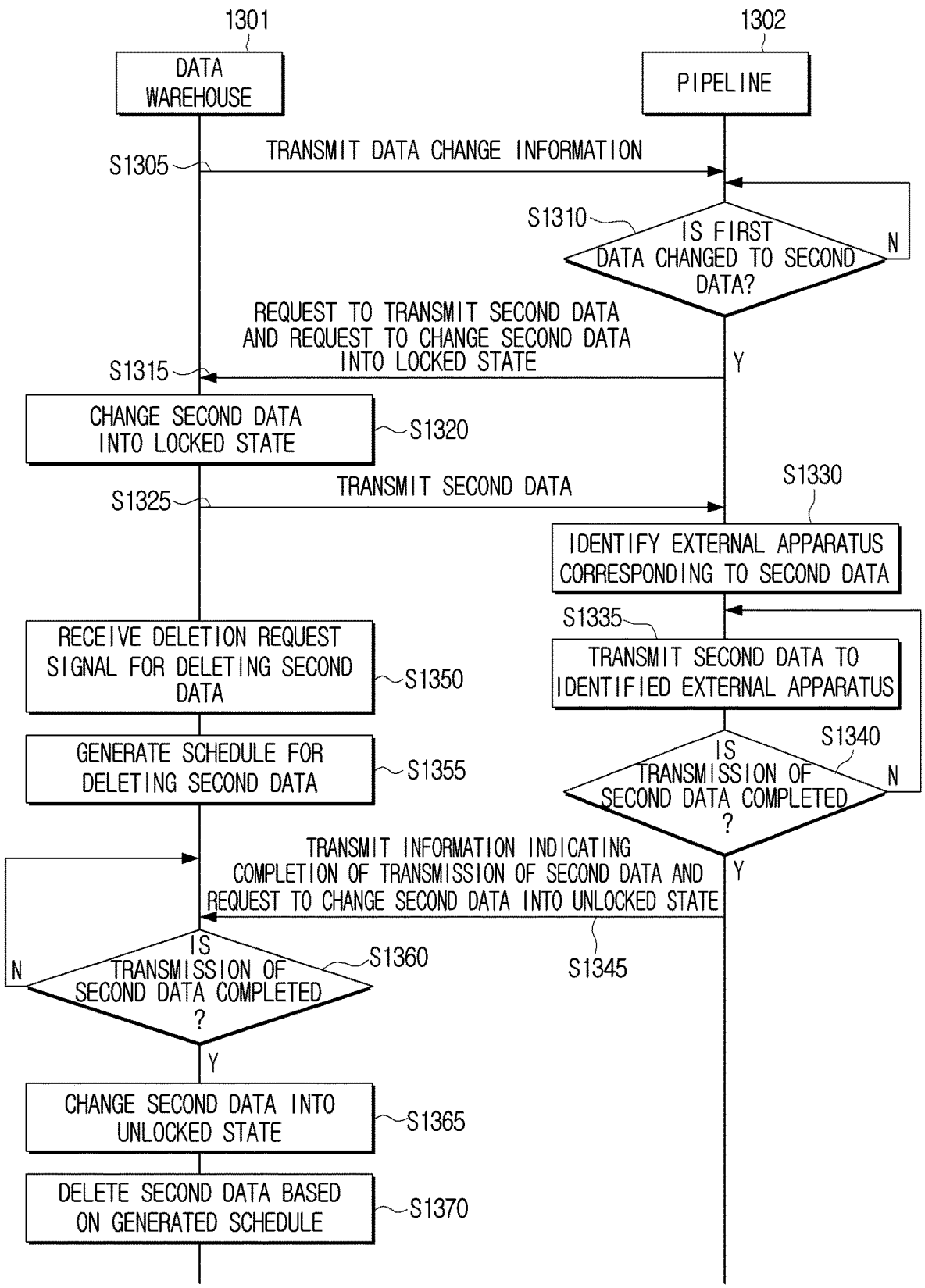
FIG. 13 is a diagram of a process of performing data change and data deletion operations of a data warehouse and a pipeline according to an embodiment.

FIG. 13 is a diagram of a process of performing data change and data deletion operations of a data warehouse and a pipeline according to an embodiment.

Referring to FIG. 13, a data warehouse 1301 may transmit data change information to a pipeline 1302 (S1305). The pipeline 1302 may determine whether first data among a plurality of pieces of data stored in the data warehouse 1301 is changed to second data (S1310). When it is identified that the first data is not changed to the second data (S1310—N), the operation S1310 may be repeatedly performed until the data change is identified.

When it is identified that the first data is changed to the second data (S1310—Y), the pipeline 1302 may request the data warehouse 1301 to transmit the second data and request the data warehouse 1301 to change the second data into the locked state (S1315).

The data warehouse 1301 may change the second data into the locked state (S1320). In addition, the data warehouse 1301 may transmit the second data to the pipeline 1302 (S1325).

The pipeline 1302 may identify an external apparatus 200 or an external sink store corresponding to the received second data (S1330). The pipeline 1302 may transmit the second data to the identified external apparatus 200 or external sink store (S1335). The pipeline 1302 may identify whether the transmission of the second data is completed (S1340).

When the transmission of the second data is not completed (S1340—N), the pipeline 1302 may repeatedly perform the operations S1335 and S1340 until the transmission of the second data is completed. When the transmission of the second data is completed (S1340—Y), the pipeline 1302 may transmit the information indicating the completion of the transmission of the second data to the data warehouse 1301 and request the data warehouse 1301 to change the second data into the unlocked state (S1345).

The data warehouse 1301 may receive a deletion request signal for deleting the second data (S1350). In addition, the data warehouse 1301 may generate a schedule for deleting the second data (S1355). Further, the data warehouse 1301 may identify whether the transmission of the second data is completed (S1360).

When it is not identified that the transmission of the second data is completed (S1360—N), the data warehouse 1301 may stand by until the transmission of the second data is completed. In addition, when the transmission of the second data is completed (S1360—Y), the data warehouse 1301 may change the second data into the unlocked state (S1365). The data warehouse 1301 may delete the second data based on the schedule generated in the operation S1355 (S1370).

In the embodiment shown in FIG. 13, a situation in which the second data is changed and the deletion request is received in the operation of synchronizing the second data is described. When the first data is changed to the second data, the pipeline 1302 may identify whether the data is changed and transmit the second data to the external apparatus 200. While the second data is being transmitted, the control command for deleting the second data may be received. When the data being transmitted is deleted during the transmission operation, a problem such as an error may occur in data processing. Accordingly, although there is a deletion command, the data warehouse 1301 and the pipeline 1302 may change the data to be transmitted into the locked state and delete the data after completing the transmission.

Figure 14:
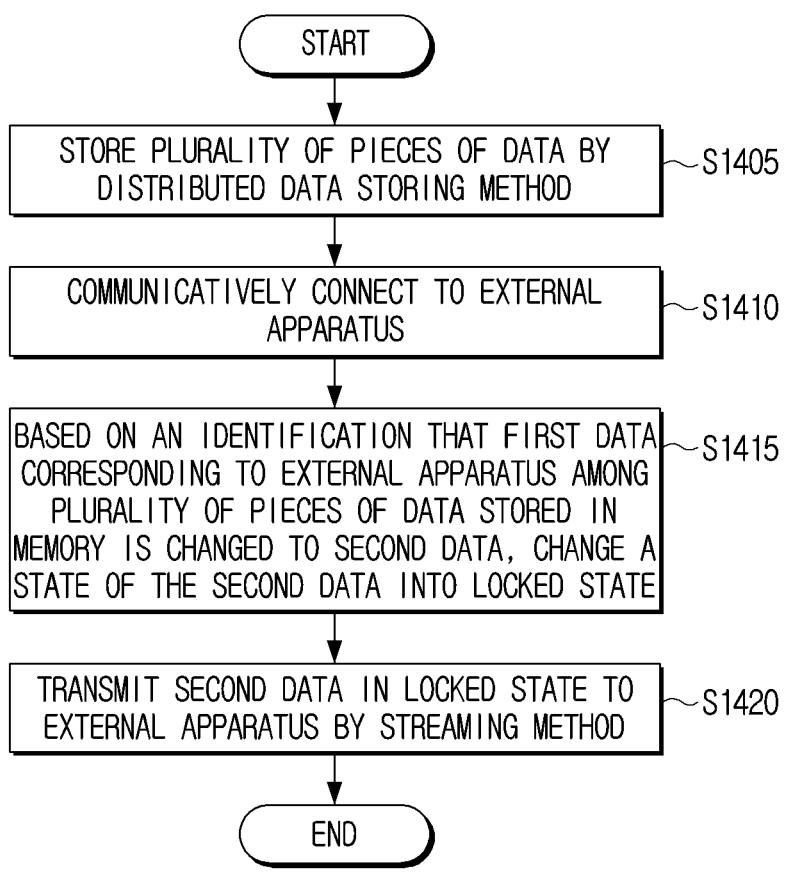
FIG. 14 is a flowchart of a method for controlling the electronic apparatus according to an embodiment.

FIG. 14 is a flowchart of a method for controlling the electronic apparatus according to an embodiment.

Referring to FIG. 14, the method for controlling the electronic apparatus 100 may include storing a plurality of pieces of data by a distributed data storing method (S1405), communicatively connecting to the external apparatus 200 (S1410), based on an identification that that first data corresponding to the external apparatus 200 among the plurality of pieces of data stored in the memory 110 of the electronic apparatus 100 is changed to second data, changing a state of the changed second data into a locked state (S1415), and transmitting the second data in the locked state to the external apparatus 200 by a streaming method (S1420). The locked state being a state where data is maintained without change according to a data change command.

The control method may further include dividing the second data in the locked state into a plurality of groups each having a predetermined size unit, and transmitting the plurality of divided groups to the external apparatus 200 by the streaming method.

The control method may further include dividing the second data into a plurality of groups each having a predetermined size unit, changing one group of the plurality of groups into a locked state, and transmitting the one group in the locked state to the external apparatus 200.

The control method may further include, when the second data in the locked state is transmitted to the external apparatus 200, changing the second data in the locked state into an unlocked state, and the unlocked state may be a state where data is changed according to the data change command.

The control method may further include, when a user input for deleting the second data among the plurality of pieces of data is received, generating a deletion request signal for deleting the second data, identifying whether the second data is being transmitted to the external apparatus 200, when the second data is being transmitted to the external apparatus 200, changing the second data into an unlocked state after completing the transmission of the second data, and deleting the changed second data in the unlocked state from the memory 110 based on the generated deletion request signal.

The control method may further include, when the second data is deleted from the memory 110, transmitting a control signal for deleting the second data stored in the external apparatus 200 to the external apparatus 200.

The control method may further include receiving identification information and a first data list of data stored in the external apparatus 200 from the external apparatus 200, obtaining a second data list corresponding to identification information of the external apparatus 200 among the plurality of pieces of data stored in the memory 110, identifying whether the first data list is the same as the second data list by comparing the first data list with the second data list, when the first data list is not the same as the second data list, generating a synchronization control command for setting the first data list to be the same as the second data list, and transmitting the generated synchronization control command to the external apparatus 200. Each of the first data list and the second data list may be a metadata list including at least one of a name, a storage location, a data type, and a data size of each of the plurality of pieces of data stored in the external apparatus 200.

The control method may further include, when third data which is included in the second data list but not included in the first data list is identified, transmitting the identified third data to the external apparatus 200.

The control method may further include, when fourth data which is not included in the second data list but included in the first data list is identified, transmitting a control command for deleting the identified fourth data to the external apparatus 200.

The memory 110 may be a database accessible by the SQL.

The method for controlling the electronic apparatus as in FIG. 14 may be performed on the electronic apparatus having the configuration of FIG. 2, and may also be performed on an electronic apparatus having other configurations.

The methods according to the various embodiments may be implemented in a form of an application installable in the electronic apparatus of the related art.

In addition, the methods according to various embodiments may be implemented simply by the software upgrade or hardware upgrade in the electronic apparatus of the related art.

Further, the various embodiments may be performed through an embedded server provided in the electronic apparatus or at least one external server of the electronic apparatus or a display apparatus.

According to an embodiment, the various embodiments may be implemented as software including instructions stored in machine (e.g., computer)-readable storage media. The machine is an apparatus which invokes instructions stored in the storage medium and is operated according to the invoked instructions, and may include an electronic apparatus according to the embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to the various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., Play Store™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
   a memory storing a plurality of pieces of data by a distributed data storing method;
   a communication interface configured to be communicatively connected to an external apparatus; and
   a processor configured to:
      based on identifying that first data corresponding to the external apparatus among the plurality of pieces of data stored in the memory has been replaced with second data, delete the first data and change a state of the second data to a locked state, and
      control the communication interface to transmit the second data in the locked state to the external apparatus by a streaming method,
   wherein, in the locked state, the second data cannot be changed in response to a data change command,
   wherein the memory is a database accessible by a structured query language (SQL), and
   wherein the processor is further configured to:
      based on an instruction for identifying a change of the data and transmitting only the changed data to outside being undefined in the SQL, generate a separate control signal capable of directly accessing the memory without using the SQL and identify whether the plurality of pieces of data are changed based on the generated control signal.

2. The electronic apparatus according to claim 1, wherein the processor is further configured to:
   divide the second data in the locked state into a plurality of groups of a predetermined size unit, and
   control the communication interface to transmit the plurality of groups to the external apparatus by the streaming method.

3. The electronic apparatus according to claim 1, wherein the processor is further configured to:
   divide the second data into a plurality of groups of a predetermined size unit,
   change a state of one group among the plurality of groups to the locked state, and
   control the communication interface to transmit the one group in the locked state to the external apparatus.

4. The electronic apparatus according to claim 1, wherein the processor is further configured to, based on the second data in the locked state being transmitted to the external apparatus, change the state of the second data to an unlocked state, and
   wherein in the unlocked state, the second data can be changed in response to the data change command.

5. The electronic apparatus according to claim 1, wherein the processor is further configured to:
   based on receiving a user input for deleting the second data among the plurality of pieces of data, generate a deletion request signal for deleting the second data,
   identify whether the second data is being transmitted to the external apparatus,
   based on the second data being currently transmitted to the external apparatus, change the state of the second data to an unlocked state after completing the transmission of the second data, and
   delete the second data in the unlocked state from the memory based on the generated deletion request signal.

6. The electronic apparatus according to claim 5, wherein the processor is further configured to, based on the second data being deleted from the memory, control the communication interface to transmit a control signal for deleting the second data stored in the external apparatus to the external apparatus.

7. The electronic apparatus according to claim 1, wherein the processor is further configured to:
   receive identification information of the external apparatus and a first data list indicating data stored in the external apparatus from the external apparatus,
   obtain a second data list corresponding to the identification information of the external apparatus from among the plurality of pieces of data stored in the memory,
   identify whether the first data list is the same as the second data list by comparing the first data list with the second data list,
   based on the first data list being different than the second data list, generate a synchronization control command to set the first data list to be the same as the second data list, and
   control the communication interface to transmit the generated synchronization control command to the external apparatus, and
   wherein the first data list and the second data list are metadata lists including at least one of a name, a storage location, a data type, and a data size of each of a plurality of contents stored in the external apparatus.

8. The electronic apparatus according to claim 7, wherein the processor is further configured to, based on third data which is included in the second data list and is not included in the first data list being identified, control the communication interface to transmit the identified third data to the external apparatus.

9. The electronic apparatus according to claim 7, wherein the processor is further configured to, based on fourth data which is not included in the second data list and is included in the first data list being identified, control the communication interface to transmit a control command for deleting the identified fourth data to the external apparatus.

10. A method for controlling an electronic apparatus, the method comprising:
   storing a plurality of pieces of data by a distributed data storing method in a memory of the electronic apparatus;
   communicatively connecting to an external apparatus;
   based on identifying that first data corresponding to the external apparatus among the plurality of pieces of data stored in the memory of the electronic apparatus replaced with second data, delete the first data and change a state of the second data to a locked state, and
   transmitting the second data in the locked state to the external apparatus by a streaming method,
   wherein, in the locked state, the second data cannot be changed in response to a data change command,
   wherein the memory is a database accessible by a structured query language (SQL), and
   wherein the method further comprises:
      based on an instruction for identifying a change of the data and transmitting only the changed data to outside being undefined in the SQL, generating a separate control signal capable of directly accessing the memory without using the SQL and identify whether the plurality of pieces of data are changed based on the generated control signal.

11. The method according to claim 10, further comprising:
dividing the second data in the locked state into a plurality of groups of a predetermined size unit; and
wherein the transmitting the second data comprises transmitting the plurality of groups to the external apparatus by the streaming method.

12. The method according to claim 10, further comprising dividing the second data into a plurality of groups each having a predetermined size unit;
wherein the changing the state of the second data to the locked state comprises changing one group among the plurality of groups to the locked state, and
wherein the transmitting the second data comprises transmitting the one group in the locked state to the external apparatus.

13. The method according to claim 10, further comprising:
based on the second data in the locked state being transmitted to the external apparatus, changing the state of the second data in the locked state to an unlocked state,
wherein in the unlocked state, the second data can be changed in response to the data change command.

14. The method according to claim 10, further comprising:
based on receiving a user input for deleting the second data among the plurality of pieces of data, generating a deletion request signal for deleting the second data;
identifying whether the second data is being transmitted to the external apparatus;
based on the second data being currently transmitted to the external apparatus, changing the state of the second data to an unlocked state after completing the transmission of the second data; and
deleting the second data in the unlocked state from the memory based on the generated deletion request signal.

* * * * *